(12) United States Patent
Yoshimoto et al.

(10) Patent No.: US 8,991,429 B2
(45) Date of Patent: Mar. 31, 2015

(54) PILOT VALVE ASSEMBLY

(75) Inventors: Mitsuhiro Yoshimoto, Ibaraki (JP); Hideaki Itou, Ibaraki (JP); Sakurako Hirano, Ibaraki (JP); Masaki Takao, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 866 days.

(21) Appl. No.: 13/147,374

(22) PCT Filed: Feb. 2, 2010

(86) PCT No.: PCT/JP2010/051385
§ 371 (c)(1),
(2), (4) Date: Aug. 2, 2011

(87) PCT Pub. No.: WO2010/090168
PCT Pub. Date: Aug. 12, 2010

(65) Prior Publication Data
US 2011/0284785 A1 Nov. 24, 2011

(30) Foreign Application Priority Data
Feb. 5, 2009 (JP) ................................ 2009-024523

(51) Int. Cl.
*F16K 11/18* (2006.01)
*G05G 9/047* (2006.01)
(Continued)

(52) U.S. Cl.
CPC .............. *F16J 15/52* (2013.01); *E02F 9/2004* (2013.01); *G05G 9/047* (2013.01); *G05G 25/04* (2013.01); *G05G 2009/04718* (2013.01)
USPC ................. 137/636.1; 137/636.2; 74/471 XY

(58) Field of Classification Search
USPC .............. 137/352, 353, 596.17, 636.1, 636.2, 137/636.3, 862, 867, 868; 74/471 XY
See application file for complete search history.

(56) References Cited

U.S. PATENT DOCUMENTS 4,296,773 A   10/1981   Harshman et al.
4,421,135 A * 12/1983   Harshman et al. ............ 137/312
(Continued)

FOREIGN PATENT DOCUMENTS

JP     7-49167 Y      11/1995
JP    2007-047865 A *  2/2007

OTHER PUBLICATIONS

Penny + Giles Launches New Higher-Stength Joystick Controller. Cision [online]. Penny + Giles, 2012 [retrieved on Sep. 6, 2014]. Retrieved from the Internet: <URL:http://news.cision.com/curtiss-wright-controls-industrial/r/penny---giles-launches-new-higher-strength-joystick-controller,c9280898>.*

(Continued)

*Primary Examiner* — Craig Schneider
*Assistant Examiner* — Jonathan Waddy
(74) *Attorney, Agent, or Firm* — Jones Robb PLLC

(57) ABSTRACT

A pilot valve assembly comprised of a pilot valve proper employing a spool to be displaced in a valve casing to bring a hydraulic pressure port and an output port into and out of communication with each other, an operation means having an operating lever with a cam member attached thereto, a pivoting shaft erected on an end plate of the pilot valve proper and connected with the manual operating lever through a universal joint, and a boot of a resilient material hermetically connected between the operation means and the end plate in such a way as to completely enshroud said universal joint, cam member and pusher, the end plate being detachably fixed to the mount member, and the boot having one end thereof connected to the operation means and having the other end hermetically gripped between the end plate and the mount member.

8 Claims, 10 Drawing Sheets

(51) Int. Cl.
*F16J 15/52* (2006.01)
*E02F 9/20* (2006.01)
*G05G 25/04* (2006.01)

(56) References Cited

U.S. PATENT DOCUMENTS

| | | | | |
|---|---|---|---|---|
| 4,445,541 A | * | 5/1984 | Schmiel | 137/636.2 |
| 4,777,981 A | * | 10/1988 | Petro | 137/636.2 |
| 4,855,704 A | * | 8/1989 | Betz | 336/132 |
| 5,176,041 A | * | 1/1993 | Meier et al. | 74/471 XY |
| 5,743,297 A | | 4/1998 | Mueller | |
| 5,831,554 A | * | 11/1998 | Hedayat et al. | 341/20 |
| 6,634,383 B2 | * | 10/2003 | Aarestad | 137/636.1 |
| 6,817,261 B2 | * | 11/2004 | Mototani et al. | 74/471 XY |
| 7,293,625 B2 | * | 11/2007 | Kumazawa | 180/333 |
| 2008/0275303 A1 | * | 11/2008 | Koitabashi | 600/146 |

OTHER PUBLICATIONS

EP Search Report of Appln. No. 10738500.7 dated Mar. 4, 2014 in English.

JP Office Action of Appln. No. 2010-549464 dated Jun. 4, 2013.

* cited by examiner

PILOT VALVE ASSEMBLY

TECHNICAL FIELD

This invention relates to a pilot valve to be used, for example, for supplying hydraulic pilot signals to a hydraulically piloted control valve which is installed within a cab of a hydraulic construction machine and manually operated by an operator at the control of the machine.

TECHNICAL BACKGROUND

Taking a hydraulic power shovel type excavator as an example of hydraulic construction machine, it is largely constituted by a vehicular base carrier and an upper swing structure, along with a hydraulic motor for driving the vehicular base carrier and for putting the upper swing structure in swinging motions. Further, a working mechanism is provided on a hydraulic excavator of this sort. As a typical example, the working mechanism is put in operation for excavation of earth. The working mechanism is generally composed of a boom which is liftably supported on the upper swing structure, an arm which is pivotally connected to a fore distal end portion of the boom through a link mechanism, and a front attachment which is pivotally connected to a fore distal end portion of the arm through a link mechanism. These boom, arm and front attachment are respectively driven by a hydraulic cylinder.

As a hydraulic actuator, each one of the afore-mentioned hydraulic motor and hydraulic cylinders has one port connected to a hydraulic pump and the other port to an operating oil tank. Each hydraulic actuator is switchably connected either to the hydraulic pump or to the operating oil tank by way of a control valve which is operated by hydraulic pilot signals. In order to apply a hydraulic pilot signal to a hydraulic pilot portion of the control valve, a pilot valve is provided in association with the control valve. In this connection, it is the general practice to install a pilot valve on a top panel of a console box within a cab, on the right or left side of an operator's seat to be taken by an operator.

The pilot valve is largely composed of a pilot valve proper which is connected to hydraulic piping, and a manual operating means including an operating lever. Normally, the pilot valve proper is provided with an end plate which is fixed on one end of a valve casing. Erected on the end plate is a support shaft to which a manual operating lever is pivotally connected through a universal joint. An opening is formed in the top panel of the console box, to which the end plate is to be fixed. The pilot valve proper is located internally of the console box in such a way as to let the manual operating means protrude upward of the top panel of the console box. The operating lever is manually tilted in an arbitrary direction by an operator.

The casing of the pilot valve proper defines a valve chamber which accommodates at least a couple of spools for sliding movements in and along the valve chamber. A pair of pusher are connected to these spools and projected out of the end plate of the valve casing. The spools, which are connected with the respective pushers, are slidable within the valve chamber, in association with the paired pushers which are each abutted against a cam member which is attached on the operating lever. As the operating lever is manually tilted, one of the pushers and the spool which is connected with that pusher are caused to make a sliding displacement within the valve chamber, while the other pusher and spool are held standstill. Normally, the pilot valve proper is provided with a pair of pushers in combination with a pair of spools, and the operating lever is tiltable in a forward or rearward direction and in a rightward or leftward direction as well, putting one of the paired spools in action when the operating lever is tilted in a forward or rearward direction, and putting the other one of the paired spools in action when the operating lever is tilted in a rightward or leftward direction.

As a construction machine, a hydraulic power shovel type excavator is mainly resorted to for outdoor operations in a dusty environment where a large amount of dust flies in the air. Therefore, it is necessary to put on a dustproof member to prevent deposition of dust on engaging portions of the operating lever and spools and on the pilot valve proper. As a dustproofing member, a boot in the form of bellows of rubber or resilient material, as in Patent Literature 1, has thus far been in wide use. One end of the dustproofing boot is connected to an operating means, while the other end at the opposite end of an intermediate bellows section is connected to an end plate. The dustproofing boot which is made of a resilient material is provided as a replaceable member because it can be irrecoverably damaged. More specifically, one end of the boot is arranged to serve as a top end anchor portion which is detachably fixable to the side of a manual operating means, while the other end of the boot is arranged to serve as a root end anchor portion which is detachably fixable to the side of an end plate of a valve casing. Both of the top and root end anchor portions are formed in the shape of a thick annular lip.

In the pilot valve unit of Patent Literature 1, the opposite ends of a dustproofing boot are arranged as a top end anchor portion and a root end anchor portion to be fixed to an outer peripheral surface of a cam and an end plate, respectively. The top end anchor portion of the boot is fixedly fitted in annular stopper groove which is formed on an outer peripheral surface of the cam. Further, in order to form an annular stopper groove on a surface of the end plate, a mount plate is fixed on a surface of the end plate by welding in such a way as to form an annular stopper groove between the end plate and the stopper plate, receiving the root end anchor portion of the boot in this annular groove on the end plate.

PRIOR ART LITERATURE(S)

Patent Literature

Patent Literature 1: Japanese Utility Model Application laid open to public under H7-49167.

SUMMARY OF THE INVENTION

Problem(s) Solved by the Invention

According to the pilot valve of Patent Literature 1 mentioned above, opposite ends of an air-tight dust proofing boot are fixedly fitted in stopper grooves, respectively. That is to say, for this purpose, an annular stopper groove is formed on both of cam member and end plate of a valve casing. Since the cam member has an outer peripheral surface, an annular stopper groove can be formed directly on that surface. On the other hand, it is difficult to form an annular groove directly on the end plate of a flat shape. Therefore, in Patent Literature 1, a mount plate is additionally attached on the end plate, resulting in an increased number of parts of the pilot valve.

In addition, in order to secure hermetical tightness at the top and root end anchor end portions which are respectively engaged with stopper grooves, each one of the top and root end anchor portions is arranged to have an inner diameter which is smaller than a diameter at an outer entrance opening of a corresponding stopper groove. However, difficulties are encountered in spreading the entirety of the root end anchor portion when fitting same into the stopper groove while holding the top end anchor portion in engagement with the stopper groove on the cam member. Besides, there has been another problem that, in order to prevent twisting of the boot, it is usually required to adjust and orient the boot into a right direction at the time of fitting the root end anchor portion in the stopper groove. Thus, the job of mounting a dustproofing boot has been time consuming and extremely troublesome.

Furthermore, after assembling a dustproofing boot, the pilot valve assembly is fixedly installed, for example, on a top panel of a console box. Bolts are usually used for fixation of the valve assembly, in combination with a valve mount plate which is fixed on an end plate of a valve casing and provided with a number of bolt holes on its outer peripheral portions. Due to existence of switches and other operating members and meters, the top panel of a console box has only a limited space for installation of a pilot valve assembly. In some cases, it is found difficult to mount a dustproofing boot by limitations of an installation space.

In view of the situations as described above, it is an object of the present invention to provide a hydraulic pilot valve assembly of a compact and simplified construction, permitting to connect a dustproofing boot easily and accurately between a valve operating means and an end plate of a valve casing end plate.

It is another object of the present invention to provide a hydraulic pilot valve assembly which is so arranged as to facilitate hermetical assembling of a dustproofing boot on a mount member in an efficient and favorable manner.

Means for Solving Problems

According to the present invention, in order to achieve the above-stated objectives, there is provided a pilot valve assembly which is comprised of; a pilot valve proper incorporating spools each adapted to be displaced within a casing to bring a hydraulic pressure port into and out of communication with an output port; an operating means including an operating lever with a cam member connected thereto; a pivoting shaft projected out of an end plate of said pilot valve proper and connected to said operating lever through a universal joint; and a boot of a resilient material interposed between said operating means and said end plate, said end plate being detachably fixed to a mount member, one end of said boot being fitted on said operating means, while the other end of said boot is fixedly gripped between said end plate and mount member.

In this case, at opposite ends of an intermediate bellows portion, the boot is formed with top and root end anchor portions each in the form of a thick lip. In this instance, a stopper groove is formed around the girder of a cam member of the manual operating means, and the top end anchor portion of the boot is fitted in this stopper groove. The mount member is provided with an opening which is passable for the boot and manual operating means but smaller in diameter as compared with outer configurations of the end plate and the root end anchor portion of the boot, the end plate is fixed to the mount member by the use of a plural number of bolts in such a way as to grip the root end anchor portion of the boot therebetween. By this arrangement, the root end anchor portion of the boot is fixed in position hermetically in a compressed state. In this connection, it is a general practice to provide a console box within a cab of construction machine. Therefore, it is possible to utilize a top panel of a console box as a mount member for the pilot valve assembly, letting the manual operating means project from lower side through an opening in the top panel.

When the root end anchor portion is gripped between the end plate and the mount member in a compressed state, a compression regulatory member can be interposed to restrict the magnitude of the compressive force on the root end anchor portion. For example, a regulatory member can be formed integrally with or separately of the end plate, in a thickness which is smaller as compared with the thickness of the root end anchor portion. By so arranging, the root end anchor portion of the boot can be fixed in a compressed state to a degree corresponding to the difference in thickness.

When installing the pilot valve assembly on a hydraulic construction machine, for example, the mount member is located in a limited space on a console box in a cab of the machine. The pilot valve proper is fixed in position by the use of a number of bolts, more particularly, clamped in position by means of bolts at three or four discrete positions. In order to minimize the installation space, it is desirable to fix the pilot valve assembly at bolt-down positions which are located as closer to each other as possible. To realize this, the bellows portion of the boot is formed in a non-circular shape having arched side portions between or alternately with receded side portions which coincide with bolt-down positions. In case of a boot having a non-circular bellows portion, the inner peripheral shape of the root end anchor portion may be in either a circular shape or a non-circular shape which is similar to the outer configuration of the bellows portion. An opening is provided in a top panel of a console box, which is utilized as a mount member, in a shape identical with or similar to the root end anchor portion of the boot. By so shaping the opening, the boot can be easily brought into a position in alignment with a plural number of bolt-down positions on the side of the mount member.

Effects of the Invention

Thus, the boot can be fitted on easily and correctly by fitting one end of the boot on the manual operating means and then bringing the mount member into engagement with the other end on the end plate in such a way as to grip the other end securely in cooperation with the end plate.

PREFERRED EMBODIMENTS OF THE INVENTION

Figure 1:
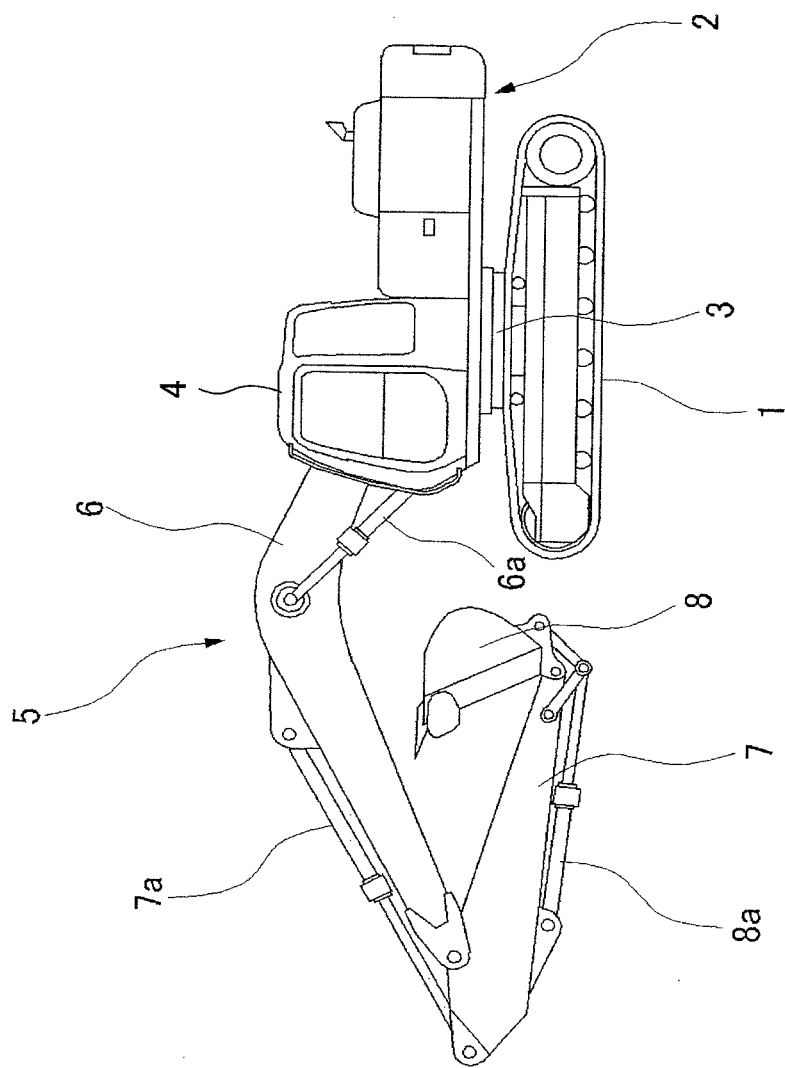
[FIG. 1] is a schematic view, showing general construction of a hydraulic power shovel type excavator, taken as an example of hydraulic construction machine.

Hereafter, the invention is described by way of its preferred embodiments. As an example of hydraulic construction machine, FIG. 1 shows general construction of a hydraulic power shovel type excavator. In that figure, indicated at 1 is a vehicular base carrier, at 2 is an upper swing structure, and at 3 is a swing mechanism which is provided between the base carrier 1 and the upper swing structure 2. Mounted on the upper swing structure 2 is a cab 4 to be occupied by an operator at the control of the machine, along with a working mechanism 5 including a boom 6, an arm 7 and a bucket or front attachment 8.

The vehicular base carrier 1 is put in travel and the upper swing structure 2 is put in a swinging motion by means of a hydraulic motor, respectively. The boom 6, arm 7 and bucket 8 are driven by hydraulic cylinders, more specifically, by a boom cylinder 6a, arm cylinder 7a and bucket cylinder 8a, respectively. Each one of these hydraulic cylinders is provided with a pair of input and output ports to function as a hydraulic actuator. Namely, each hydraulic cylinder is driven by supplying pressure oil to one port, which is located in antagonistic relation with the other port on the return side.

Figure 2:
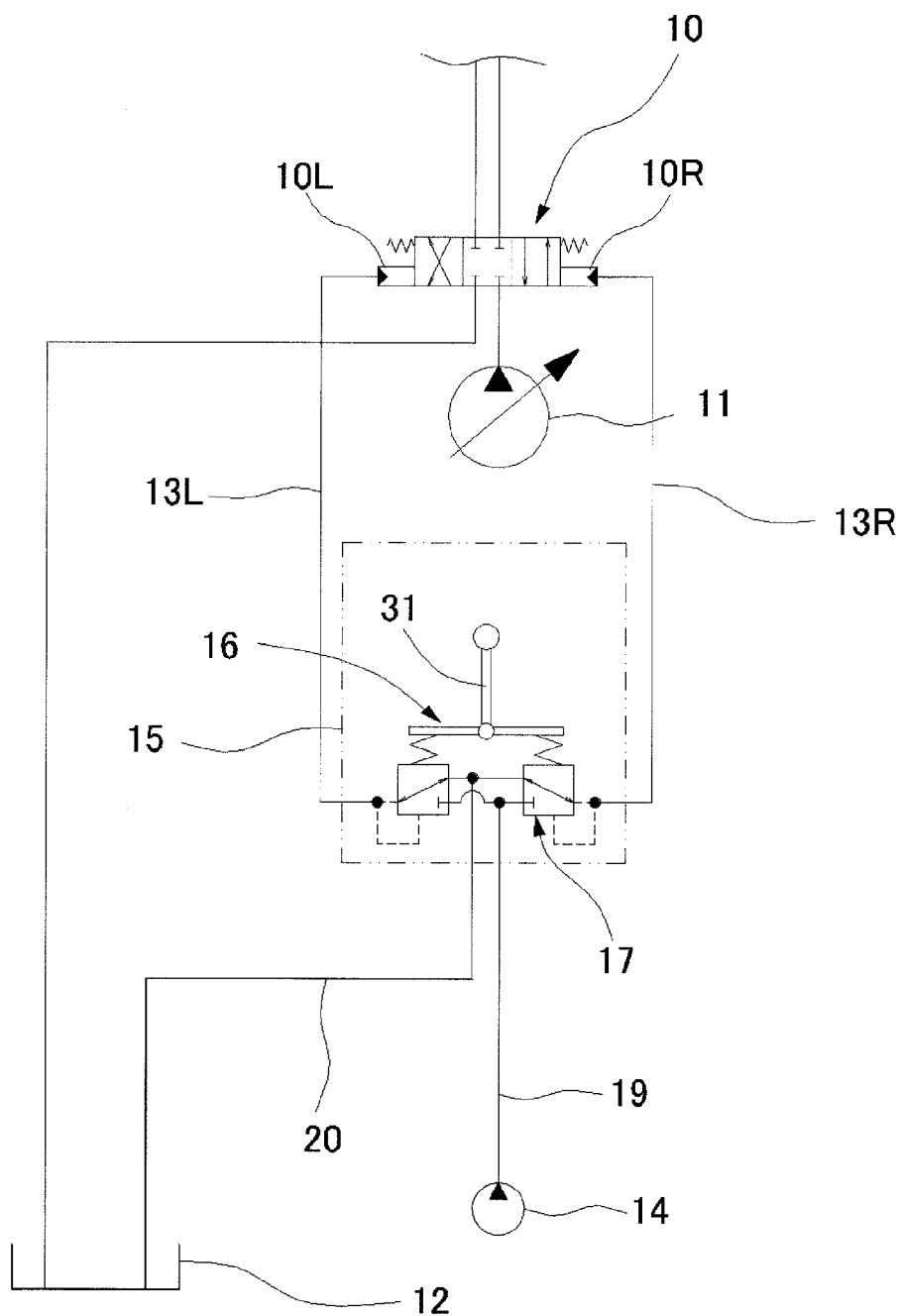
[FIG. 2] is a diagrammatic view of a hydraulic circuit including a pilot valve and a control valve under control of the pilot valve.

For this purpose, as shown in FIG. 2, the input and output ports of a hydraulic actuator are switchably connected between hydraulic pump 11 and an operating oil tank 12 by way of a control valve 10. The position of the control valve 10 is changed over by a hydraulic pilot pressure which is applied to either one of opposite pilot portions 10L and 10R in communication with opposite pilot pressure conduits 13L and 13R, respectively. One of the pilot pressure conduits 13L and 13R is connected to a pilot pressure pump 14 and the other one is connected to the operating oil tank 12 thereby to change over the position of the control valve 10.

For the purpose of controlling the switching operation of the control valve 10 as mentioned above, a pilot valve assembly 15 is installed within the cab 4. The pilot valve assembly 15 is composed of a manual operating means 16 and a pilot valve proper 17. The above-mentioned pilot pressure conduits 13L and 13R are connected to a casing 18 of the pilot valve proper 17 to serve as output conduits, respectively. In addition, a hydraulic pressure conduit 19 from a pilot pump 14 as well as a return conduit 20, which is connected to the operating oil tank 12, is connected to the pilot valve proper 17. By manipulation of the operating means 16, one of the pilot conduits 13L and 13R is connected to the hydraulic pressure conduit 19, which is connected to the pilot valve proper 17, while the other one of the pilot conduits 13L and 13R is connected to the return conduit 20, producing a pressure differential between the hydraulic pilot portions 10L and 10R of the control valve 10 to change over the position of the latter.

Figure 3:
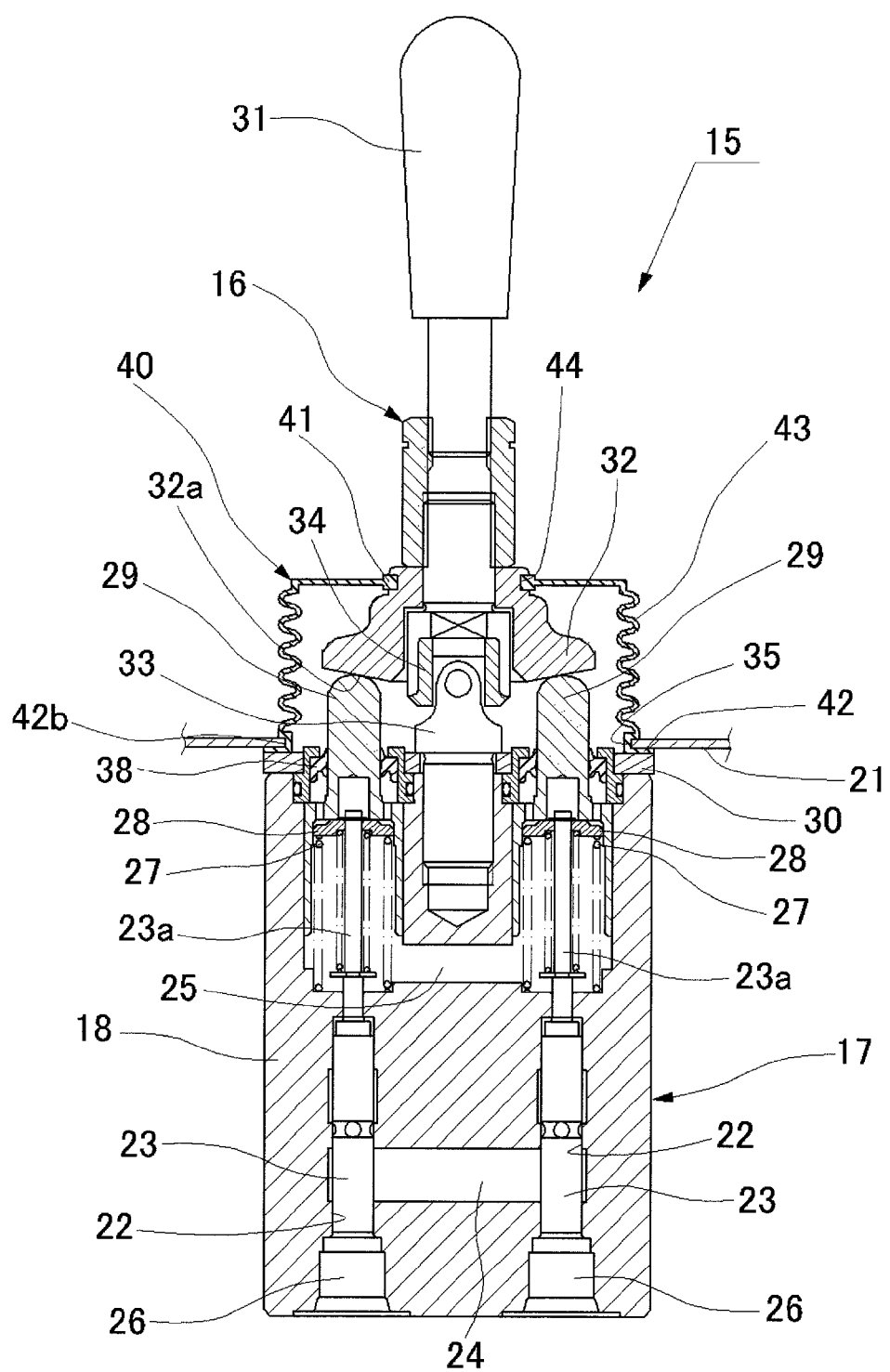
[FIG. 3] is a sectional view of a pilot valve assembly embodying the present invention.
Figure 4:
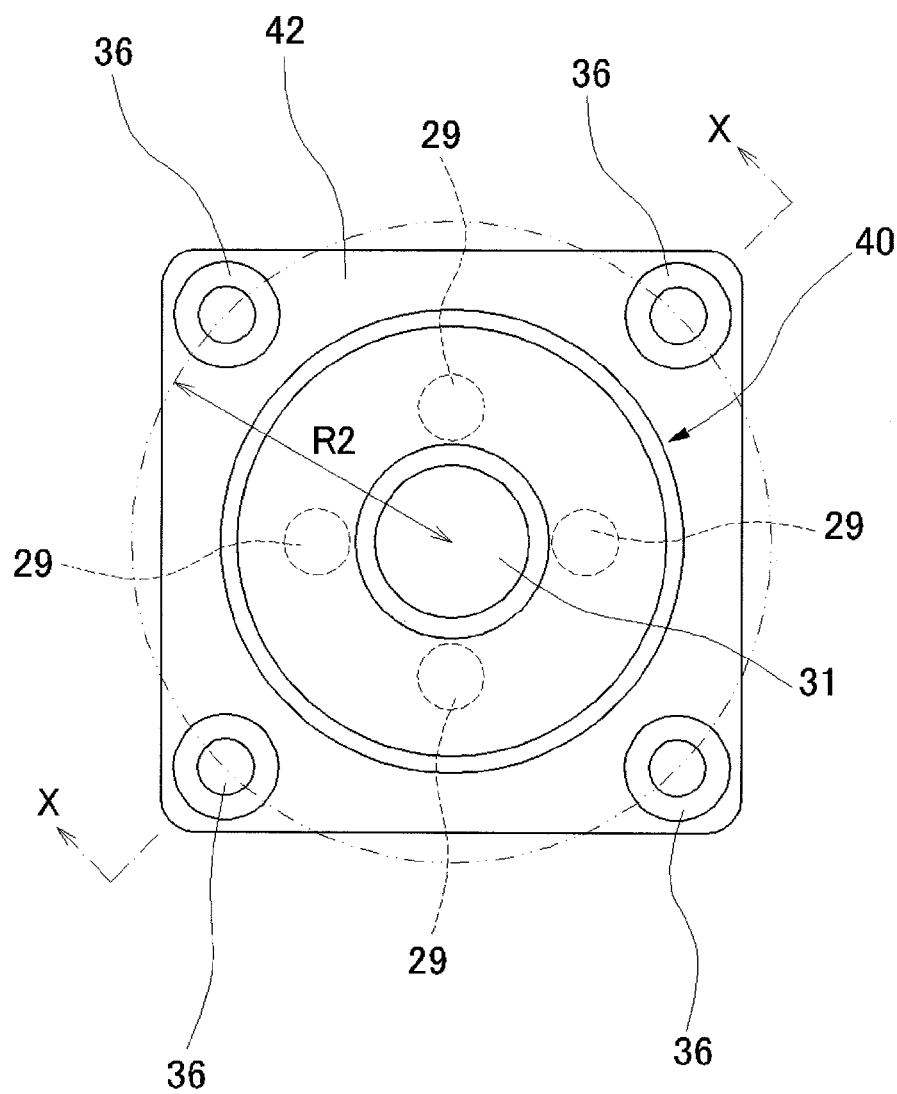
[FIG. 4] is a plan view of the pilot valve assembly of FIG. 3.
Figure 5:
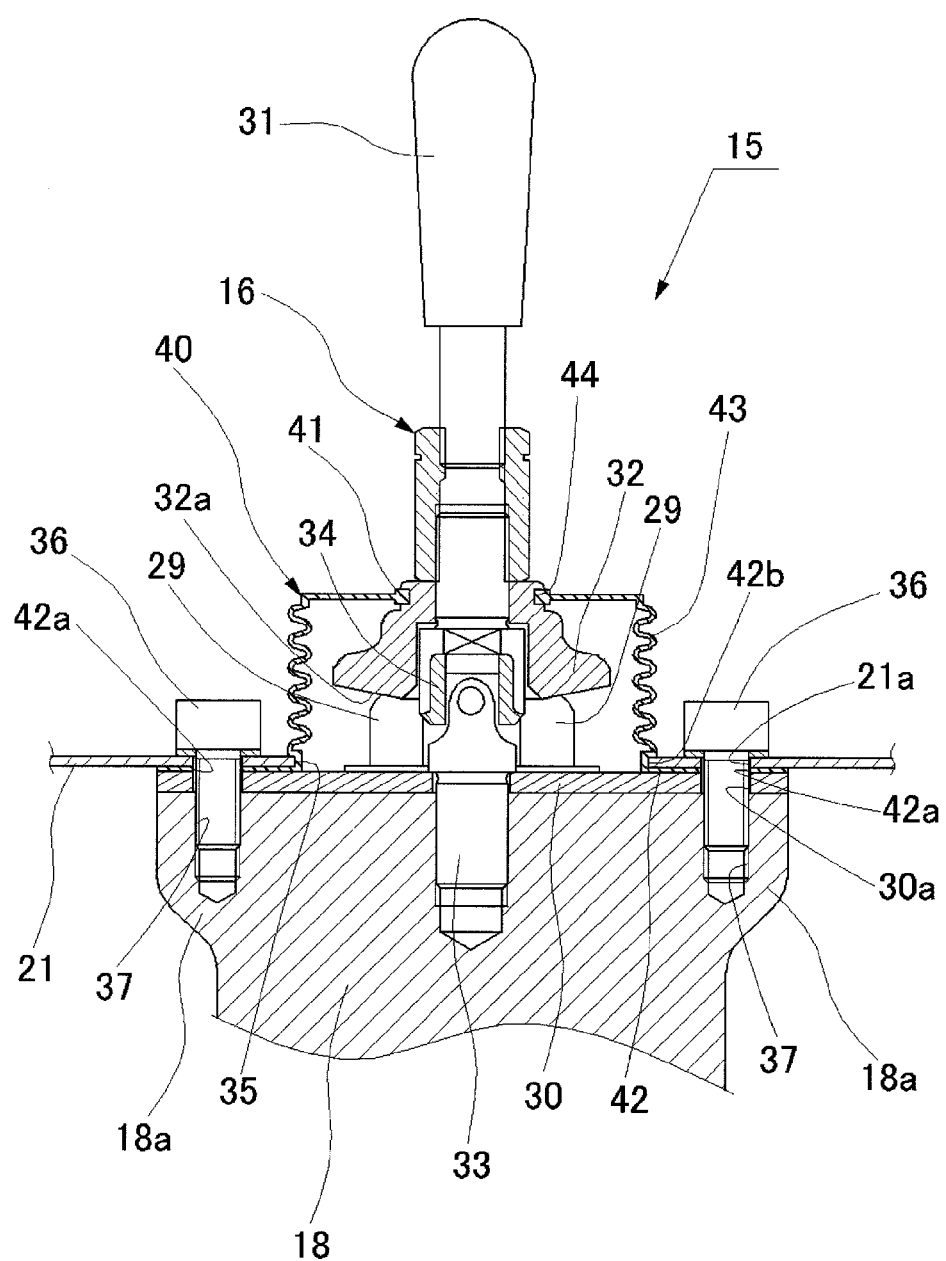
[FIG. 5] is a sectional view taken on line X-X of FIG. 4.

The pilot valve 15 is built in the manner as shown in FIGS. 3 through 5. The pilot valve 15 which is shown in these figures is intended for installation on a top panel of a console box at one side of an operator's seat within a cab 4. The pilot valve proper 17 of the pilot valve assembly 15 is located under a top panel 21 in such a way that the manual operating means 16 projected above the top panel 21. Valve chambers 22 are provided side by side within the casing 18 of the pilot valve proper 17, each having a spool 23 slidably fitted therein. Each valve chamber 22 is communicated with a high pressure port 24 which is connected to a hydraulic conduit 19 on the high pressure side, and with a low pressure port 25 which is connected to a return conduit 20, switching an output port 26 between the high pressure port 24 and the low pressure port 25 by displacement of the spool 23. Under the influence of a biasing action of a return spring 27, normally each one of the two output ports is held in communication with the low pressure port 25. When one of the spools 23 is depressed against the biasing action of the return spring 27, one output port 26 is connected to the high pressure port 24 to apply a pilot signal to either one of the hydraulic pilot portions 10L and 10R of the control valve 10.

Each one of the return springs 27 is adapted to exert a force on a spring shoe 28 to which a fore end of a connection rod 23a of the spool 23 is attached. On the other hand, a pusher 29 is abutted on the spring shoe 28. An end plate 30 is attached on the upper end of the valve casing 18 of the pilot valve proper 17, letting the pusher 29 project upward of the end plate 30. The pilot valve 15 is fixedly mounted on a top panel 21 of a console box by fixing the end plate 30 securely to the top panel 21. Connections of hydraulic passages in the pilot valve proper 17 are switched by depressing one of the pushers 29. As seen from FIG. 4, valve units, each consisting of the valve chamber 22, spool 23 and pusher 29, are provided in pairs, that is, a pair in front and rear positions and a pair in right and left positions.

To put the spool 23 in a sliding displacement within the valve chamber 22 by depressing the pusher 29, the manual operating means 16 is provided with an operating lever 31. A cam member 32 is attached on this operating lever 31, with a cam surface 32a of the cam member 32 in abutting engagement with a top end of each pusher 29. The operating lever 31 is pivotally supported on the end plate 30 in such a way as to be tiltable in both forward and rearward directions and in rightward and leftward directions as well. Thus, the operating lever 31 is supported on a pivoting shaft 33 and projected upward through the end plate 30 of the valve casing. The manual operating means, i.e. an assembly of the operating lever 31 and the cam member 32, is coupled with the pivoting shaft 33 through a universal joint member 34.

The end plate 30 is fixed to the top panel 21 of a console box, which is utilized as a mount member in this embodiment. The top panel 21 is provided with an opening 35 having an open area which is smaller as compared with outer configuration of the end plate 30. The end plate 30 is placed in position from the lower side of the top panel 21, letting the manual operating means 16, including the operating lever 31, project upward through the opening 35 in the top panel 21. The pilot valve proper 17 as well as the end plate 30 at an end of the main body 17 has an outer configuration which is larger than the open area of the opening 35, permitting to secure bolt-down areas to be used when mounting the pilot valve assembly 15 fixedly on the console box by means of a number of bolts 36.

As shown in FIG. 4, the pilot valve assembly 15 is fixed on the top panel 21 of a console box at four positions by the means of bolts 36. For this purpose, as shown in FIG. 5, the casing 18 of the pilot valve proper 17 is provided with four bulged flank portions 18a at angular intervals of 90 degrees. At bulged flank portions 18a, bolt insertion holes 21a and 30a are bored in the top panel 21 and the end plate 30, so that the pilot valve assembly 15 can be fixedly mounted on the console box by threading bolts 36 into screw holes 37 through the respective bolt insertion holes 21a and 30a in the top panel 21 and the end plate 30.

When the pilot valve assembly 15 is mounted on the console box, the universal joint 34 as well as abutting portions of the cam member 32 and pushers 29 is located upward of the top panel 21. In order to avoid exposure of these portions to the outside and to hermetically seal off the upper portions of the pushers 29 which are projected on the upper side of the end plate 30, for protection from dust in cooperation with a seal member 38 shown in FIG. 3, a boot 40 is fitted and fixed between the cam members 34 of the manual operating means 16 and the end plate 30 in such a way as to provide a hermetically sealed space internally of the boot 40. The boot 40 is formed of a resilient material like rubber and provided with a top end anchor portion 41 at one end and a root end anchor portion 42 at the other end of an intermediate bellows portion 43.

The top end anchor portion 41 of the boot 40 is formed in annular shape, while the root end anchor portion 42 is formed in a square shape in outer configuration and centrally provided with a circular aperture. Both of the top and root end anchor portions 41 and 42 are increased in wall thickness as compared with other portions of the boot 40. An annular stopper groove 44 is formed on and around the outer periphery of the cam member 32 to receive the top end anchor portion 41 of the boot 30. The stopper groove 44 is formed in a width which is smaller than thickness of the top end anchor portion 41, so that the latter is fixed in the stopper groove 44 in a compressed state. The top end anchor portion 41 is in the form of an annular inward projection, while the root end anchor portion 42 is in the form of a sheet of a square shape in outer configuration and extended outward of the bellows portion 43. Further, as shown in FIG. 5, bolt insertion holes 42a are bored in four outer corner portions of the root end anchor portion 42 for insertion of bolts 36.

The top end anchor portion 41 is arranged to have a thickness which is larger as compared with width of the stopper groove 44 and to have an inside diameter which is smaller as compared with outside diameter of the cam member 32. Accordingly, by stretching the top end anchor portion 41 radially outward in such a way as to increase its inside diameter through resilient deformation, the top end anchor portion 41 can be urged to ride onto the outer periphery of the cam member 32 and snap into the stopper groove 44 by contraction of the inside diameter in the stopper groove 44.

In the manner just described, the top end anchor portion 41 of the boot 40 is fitted on by engagement with the stopper groove 44 on the cam member 32. On the other hand, the root end anchor portion 42 of the boot 40 is fixed in position by gripping same between the end plate 30 and the top panel 21 of a console box, which is adopted to serve as a mount member. The boot 40 is provided with a shallow coupling groove 42b around a root end anchor portion 42 for engagement with marginal wall portions around the opening 35 in the top panel 21. This coupling groove 42b is provided not for fixation of the boot 40 but for orienting the boot 40 into an adjusted position when mounting same in the opening 35 of the top panel 21.

Upon mounting the pilot valve assembly 15 on a console box, the boot 40 on the pilot valve assembly 15, which is not yet assembled with the operating lever 31 of the manual operating means 16, is oriented into a predetermined adjusted position relative to the top panel 21. More specifically, the boot 40 is oriented in such a way as to bring the bolt insertion holes 42a on the side of the boot 40 into alignment with the bolt insertion holes 30a on the side of the end plate 30. In the next place, the pilot valve assembly 15, without the operating lever 31, is placed in the opening 35 of the top panel 21 from above, and bolts 36 are threaded into the bulged flank portions 18a of the pilot valve proper 17 through the bolt insertion holes 21a in the top panel 21. Whereupon, the root end anchor portion 42 is fixed in position in a compressed state between the top panel 21 and the end plate 30. Then, the top end anchor portion 41 is fitted in the stopper groove 44 on the outer periphery of the cam member 32 to connect the boot 40 to the pilot valve assembly 15. After this, the operating lever 31 is assembled at the top to complete installation of the pilot valve assembly 15.

Thus, at the time of mounting the pilot valve assembly on a console box in the manner as described above, the boot 40 is fitted on the pilot valve assembly 15 in such a way as to enshroud the abutting portions of the cam member 32 and the pushers 29 and to enshroud the universal joint 34 as well. At this time, the boot 40 is fixed on the pilot valve assembly 15, forming a hermetical seal between the top end anchor portion 41 and the stopper groove 44 on the cam member 32 and between the root end anchor portion 42 and the end plate 30.

In the embodiment described above, no means is provided for limiting the degree of compression of the root end anchor portion 42 of the boot 40 by the bolts 37. Compressing actions of the bolts 36 on the root end anchor portion 42 can be limited to a minimum magnitude which is necessary for the root end anchor portion 42 to maintain a hermetical seal, by adoption of a compression regulatory member as shown in FIG. 6 or 7.

Figure 6:
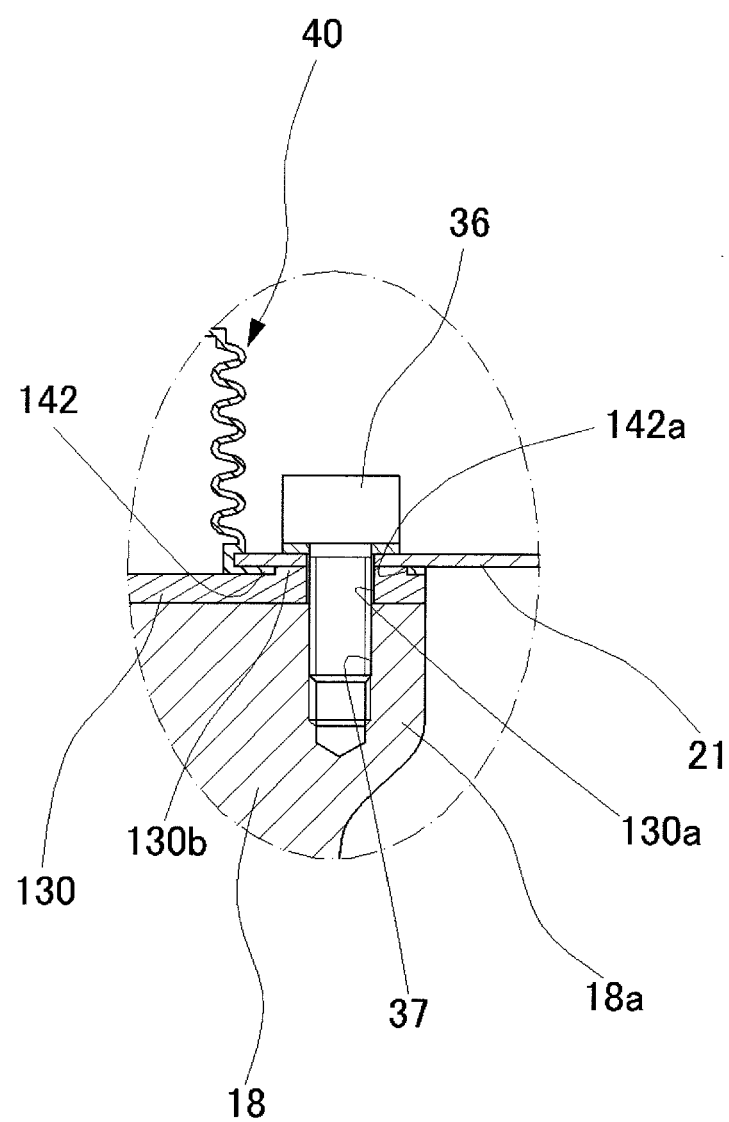
[FIG. 6] is a fragmentary sectional view of a pilot valve assembly in another embodiment of the invention.
Figure 7:
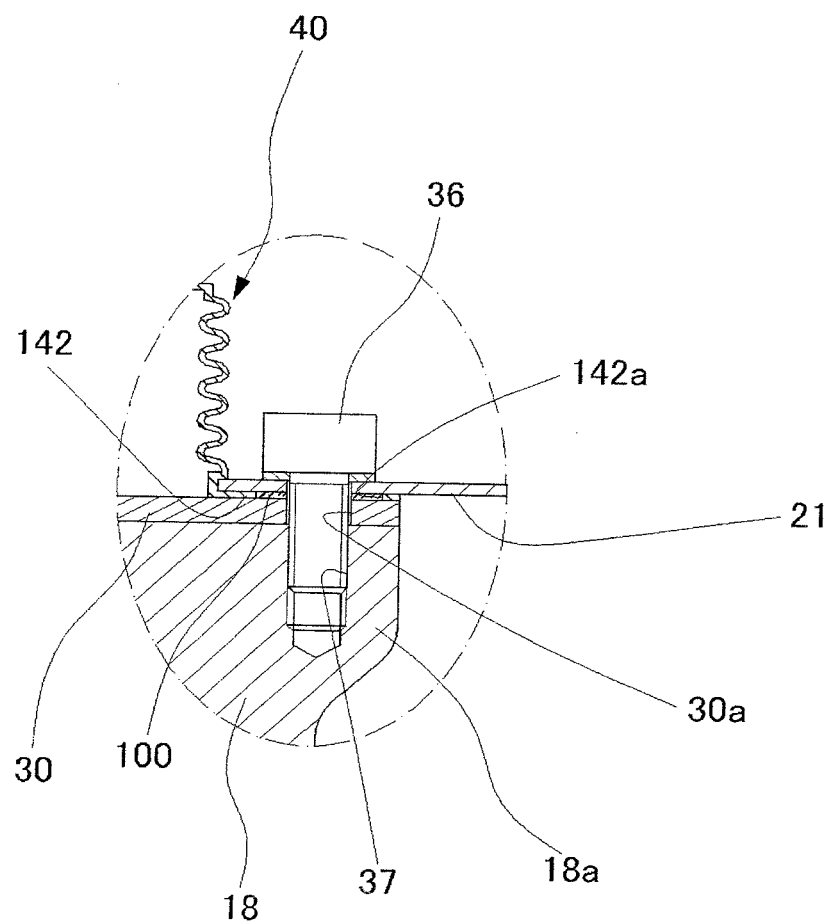
[FIG. 7] is a fragmentary sectional view of a pilot valve assembly in still another embodiment of the invention.

More specifically, in a modification shown in FIG. 6, a raised step portion 130b is provided around each bolt insertion hole 130a in the end plate 130, the step portion 130b having a larger height as compared with thickness of the root end anchor portion 142 of the boot 40. Therefore, when the root end anchor portion 142 is gripped between the end plate 130 and the top panel 21 of a console box, it is compressed in a degree corresponding to the difference between the thickness of the root end anchor portion 142 and the height of the raised step portion 130b. Accordingly, in the case of this embodiment, each one of bolt insertion holes 142a in the root end anchor portion 142 is arranged to have a diameter which is slightly larger than outside diameter of the raised step portion 130b. Further, in another modification shown in FIG. 7, a washer 100 is interposed between the end plate 30 and the top panel 21 of a console box. This washer 100 is of a thickness which is equivalent to the height of the raised step portion 130b. Similarly, the aperture in the root end anchor portion 142 is arranged to have the same diameter as the bolt insertion hole 142a shown in FIG. 6.

Figure 8:
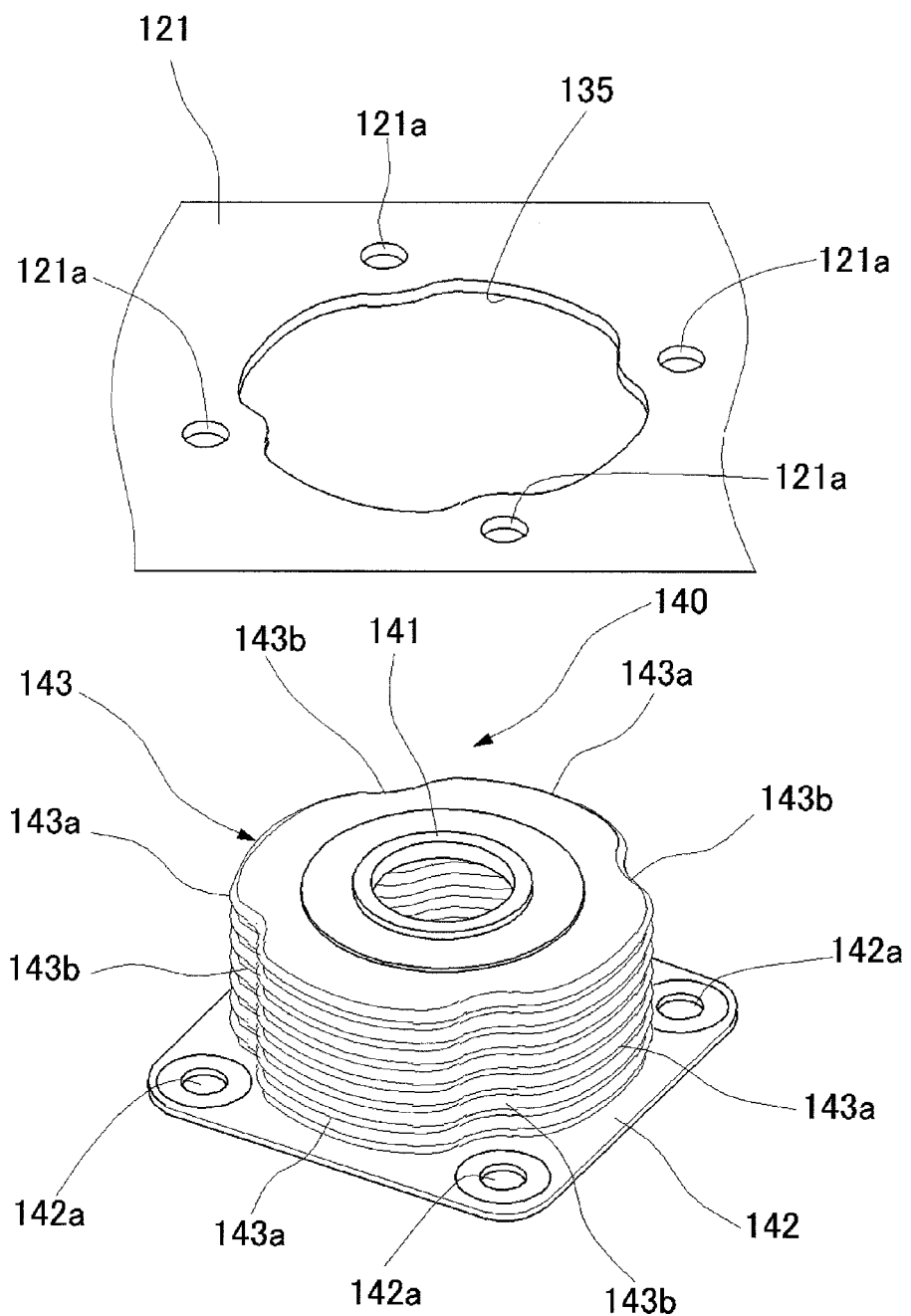
[FIG. 8] is a perspective view of a boot and a top panel adopted for a pilot valve assembly in a further embodiment of the invention.
Figure 9:
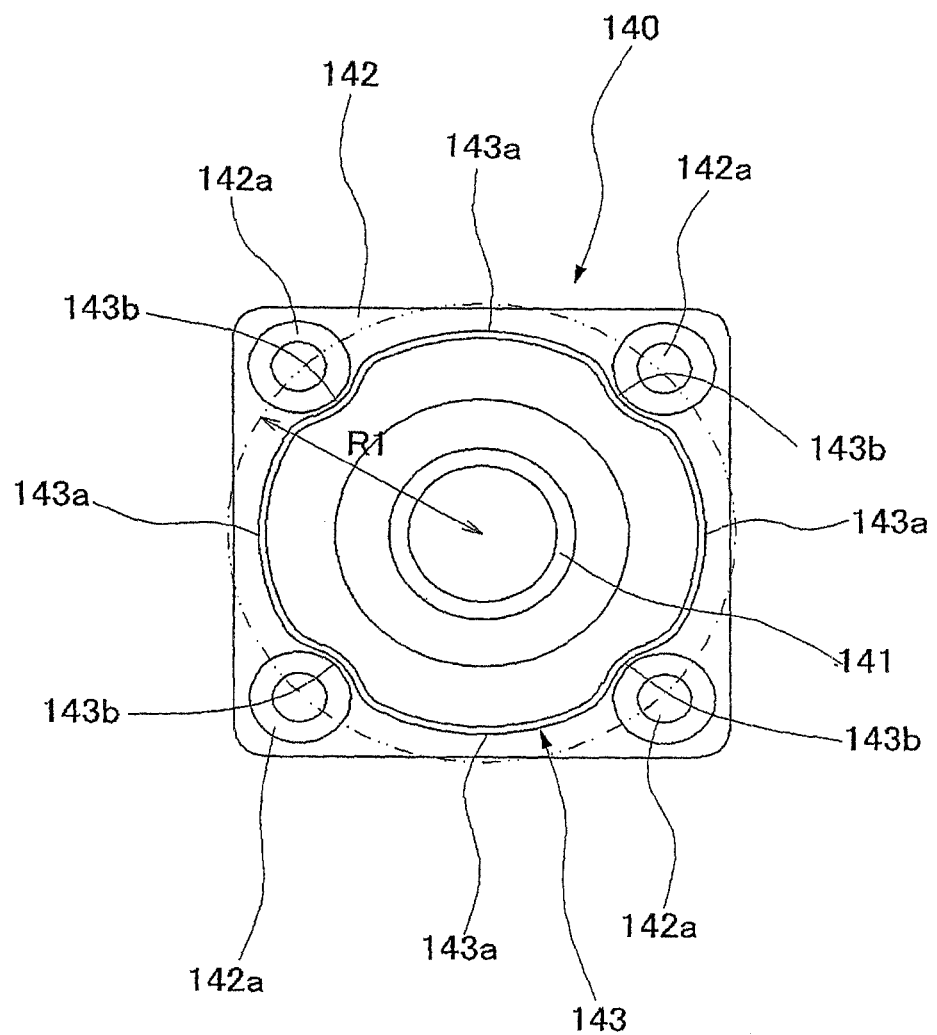
[FIG. 9] is a plan view of the boot shown in FIG. 8.

Further, the bellows portion 43 of the boot 40 may be formed substantially in a cylindrical shape or in a non-circular shape like a boot 140 shown in FIGS. 8 and 9. This boot 140 is provided with a top end anchor portion 141 in the shape of a round ring, in combination with a root end anchor portion 142 which is substantially of a square shape. In this particular example, the boot 140 is provided with a bellows portion 143 which is not in a simple cylindrical shape, namely, with a bellows portion 143 having four bulged arch-form side portions 143a alternately with receded side portions 143b to be located radially in alignment with bolt insertion holes 142 in the root end anchor portion 142. That is to say, centers of the bolt insertion holes 142 can be located on a circle having a radius R1 which is smaller than the radius R2 of a circle interconnecting centers of the bolts 36 (or centers of the bolt insertion holes 42a). This means that the root end anchor portion 142 can be reduced in external dimensions to a significant degree. Accordingly, the pilot valve assembly can be mounted on the top panel 121 of a console box even in a case where a mount area on the top panel 121 is limited by existence of switches or other members.

Figure 10:
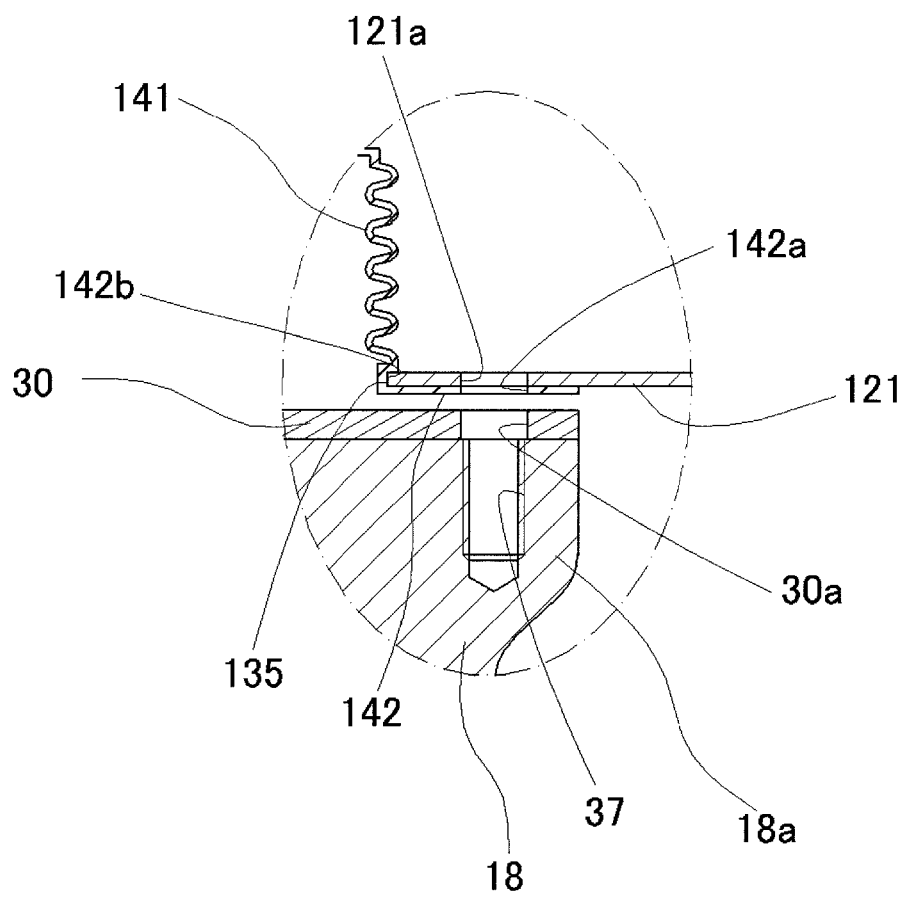
[FIG. 10] is a fragmentary sectional view illustrating the manner of assembling the boot with the top panel in the embodiment of FIG. 8.

In the case of a non-circular boot like the boot 140 described above, an opening 135 of a corresponding non-circular shape, i.e. a shape identical with or similar to the outer configuration of the bellows portion 143 of the boot 140, is formed in the top panel 121 as shown in FIG. 8. By so arranging, as shown in FIG. 10, the bolt insertion holes 142a in the root end anchor portion 142 are brought into aligned positions relative to the bolt insertion holes 121a in the top panel 121 when an anchor groove 142b on the root end anchor portion 142 of the boot 140 is fitted on marginal edge portions of the top panel 121. Accordingly, the screw holes 37 on the pilot valve proper 18 of the pilot valve assembly 15 are aligned with the respective bolt insertion holes 121a and 142a, permitting to thread the bolts 36 readily into the respective screw holes 37 to complete the assembling work of the pilot valve 15 in an efficient manner.

Description Of Reference Numerals

| | |
|---|---|
| 15: Pilot Valve Assembly | 16: Manual Operating Means |
| 17: Pilot valve proper | 18: Casing |
| 21: Top Panel of Console Box | 21a: Bolt Insertion Hole |
| 23: Spool | 24: Hydraulic Pressure Port |
| 26: Output Port | 29: Pusher |
| 30, 130: Pilot valve proper | 30a, 130a: Bolt Insertion Hole |
| 31: Manual Lever | 32: Cam Member |
| 33: Pivoting Shaft | 34: Universal Joint |
| 35: Opening | 36: Bolt |
| 40, 140: Boot | 41, 141: Top end anchor portion |
| 42, 142: Root end anchor portion | 42a, 142a: Bolt Insertion Hole |
| 43, 143: Bellows Portion | 100: Washer |
| 130b: Raised Step Portion | 143a: Arch-form Side Portion |
| 143b: Receded Side Portion | |

The invention claimed is:

1. A pilot valve assembly which is comprised of:
a pilot valve proper incorporating spools each adapted to be displaced within a casing to bring a hydraulic pressure port into and out of communication with an output port;
a manual operating member including an operating lever with a cam member connected thereto,
a pivoting shaft projected out of an end plate of said pilot valve proper and connected to said operating lever through a universal joint; and
a boot of a resilient material interposed between said operating member and said end plate, said end plate being detachably fixed to a mount member, said boot comprising a top end anchor portion, a root end anchor portion and an intermediate bellows portion, said top end anchor portion of said boot being fitted on said operating member, while said root end anchor portion of said boot is fixedly gripped between said end plate and said mount member;
said top end anchor portion being fitted in a stopper groove formed on and around an outer peripheral surface of said cam member of said operating member, said mount member being provided with such an opening as to permit insertion of said operating member having said top end anchor portion attached thereto;
said mount member being securely fixed on said pilot valve proper by the use of a plural number of bolts; and
said bellows portion of said boot being formed in a generally circular shape but comprising partially receded side portions for use as bolt-down positions, wherein said receded side portions are located radially in alignment with bolt insertion holes.

2. A pilot valve assembly as set forth in claim 1, wherein said mount member is constituted by a top panel of a console box in a cab of a construction machine, and said manual operating member is mounted in such a way as to project upward from a lower side of said top panel through said opening.

3. A pilot valve assembly as set forth in claim 1, wherein said bellows portion of said boot is provided with a plural number of arcuately bulged side portions between or alternately with said receded side portions.

4. A pilot valve assembly as set forth in claim 1, wherein said root end anchor portion of said boot is provided with a shallow coupling groove to be engaged with marginal wall portions of said mount member forming said opening, said shallow coupling groove being adapted to orient and maintain said boot in a predetermined adjusted position when fitted in said opening.

5. A pilot valve assembly as set forth in claim 1, wherein said root end anchor portion of said boot is gripped between said end plate and said mount member through a compression regulatory member in control of compressive force acting on said root end anchor portion.

6. A pilot valve assembly as set forth in claim 5, wherein said compression regulatory member is in the shape of a raised step portion formed on said end plate.

7. A pilot valve assembly as set forth in claim 1, wherein first ends of said partially receded side portions are adjacent to said top end anchor portion, and second ends of said partially receded side portions are adjacent to said root end anchor portion.

8. A pilot valve assembly as set forth in claim 1, wherein a direction of insertion of said plural number of bolts into said mount member corresponds to a direction of formation of said partially receded side portions.

* * * * *